March 26, 1963     J. R. WILLIAMSON ETAL     3,082,600
ROCKET ENGINE THRUST CONTROL SYSTEM
Filed July 23, 1958     2 Sheets-Sheet 1

INVENTORS
JOHN R. WILLIAMSON
BENNY R. COLEMAN
BY Robert C. Smith
ATTORNEY

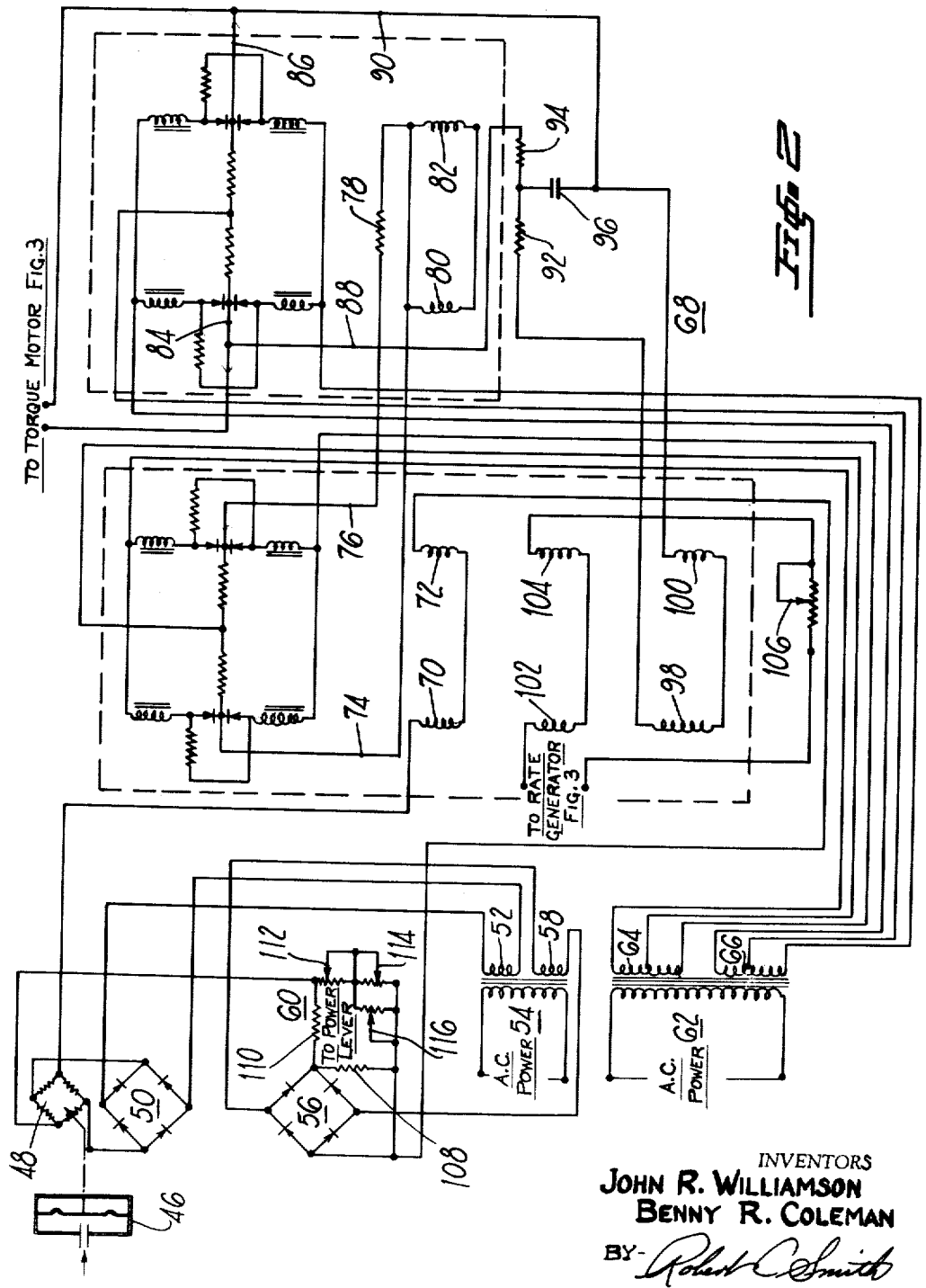

3,082,600
Patented Mar. 26, 1963

3,082,600
ROCKET ENGINE THRUST CONTROL SYSTEM
John R. Williamson and Benny R. Coleman, South Bend, Ind., assignors to The Bendix Corporation, a corporation of Delaware
Filed July 23, 1958, Ser. No. 750,425
6 Claims. (Cl. 60—35.6)

This invention relates to fuel systems and more particularly to a servo-operated system having particular utility in the metering of highly corrosive fuels and oxidizers used with rocket engines.

Rocket engines presently in use often require either a single fuel which is highly corrosive or an oxidizer such as hydrogen peroxide or nitric acid which are also very corrosive and difficult to handle. In some of the previously known systems, an attempt has been made to meter such fluids by means of servo-operated controls in which the force multiplying system or hydraulic amplifier uses a conventional hydrocarbon servo fluid. In such cases it becomes necessary that very effective dynamic seals be provided between chambers containing hydraulic oil and such substances as hydrogen peroxide because of the danger of combustion within the control system itself. These seals have proved to be troublesome, both because of the power required to operate members through them and because of the hysteresis effects which they produce, leading to difficult calibration problems. Also they have often contributed considerable undesirable size and weight to the system. It is therefore an object of the present invention to provide a servo-operated control for metering highly corrosive fluids in which the fluid metered is the same as that which is used in the hydraulic servo amplifier.

It is a further object to provide a servo-operated control as set forth in the above object in which the flow of fluid through the servo system is in parallel with the flow across the metering valve.

It is another object to provide a servo-operated control for metering highly corrosive fluids in which no dynamic seals are required.

It is another object to provide a servo-operated control for metering highly corrosive fluids in which a very rugged and compact electrical signal producing means is used to control the hydraulic amplifier and in which said hydraulic amplifier contains a very simple valve rate feedback signal generator.

Other objects and advantages will appear from the following specification taken in connection with the accompanying drawings in which:

FIGURE 2 is a schematic drawing of the electrical portion of the system of FIGURE 1.

Figure 1:
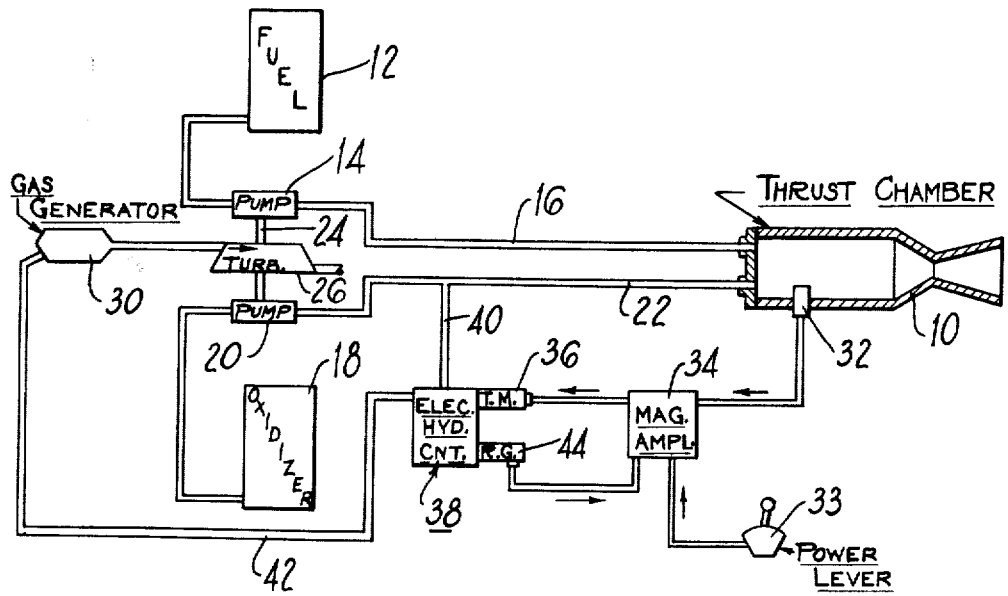
FIGURE 1 is a schematic diagram of a fuel system for a rocket engine using the present invention.

The thrust chamber of a rocket engine is shown generally at numeral 10. This thrust chamber is supplied with fuel from a fuel source 12 through a pump 14 and a line 16 and an oxidizer such as hydrogen peroxide from a source 18 through a pump 20 and a conduit 22. The pumps 14 and 20 are connected with a common shaft 24 driven by a turbine 26 which, in turn, is driven by the hot gas output emanating from a gas generator 30. Inasmuch as the pumps 14 and 20 are driven by the same turbine 26, a constant proportion of fuel and oxidizer is supplied to the thrust chamber 10 for combustion therein. Combustion in thrust chamber 10 results in the creation of a fluid pressure which is sensed by means of a pressure transducer 32 and this pressure signal, which varies in substantially direct proportion to the thrust output of the chamber 10 is connected to a magnetic amplifier 34 where it is compared with a thrust reference signal requested by a power lever 33, is amplified, and the amplified signal is used to control a torque motor 36 forming part of an electro-hydraulic control unit 38. The electro-hydraulic control unit is connected to receive as a fluid input through a conduit 40 a portion of the output of oxidizer (hydrogen peroxide) from pump 20 which flows through conduit 22. The output of the metering unit 38 is a metered flow of oxidizer through a conduit 42 to the gas generator 30. Where hydrogen peroxide is used, the gas generator 30 includes a suitable catalyst contained therein which catalyst, not shown, may be any one of those known to those persons skilled in the appropriate art. The catalyst causes the hydrogen peroxide to be decomposed into steam and surplus oxygen at a very high temperature which is used to rotate the turbine 26. The hydraulic control 38 also includes a rate generator 44 which provides a feedback signal to the magnetic amplifier 34.

Figure 3:
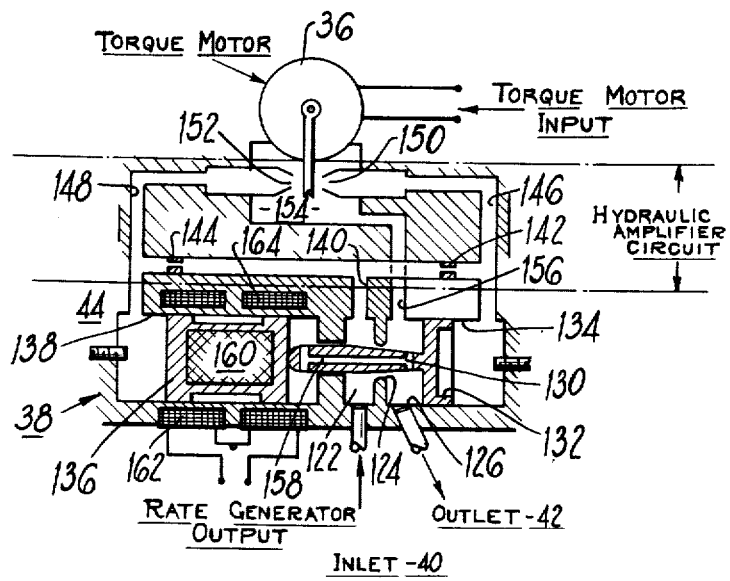
FIGURE 3 is a cross sectional view of the hydromechanical portion of the control system of FIGURE 1 including the torque motor driven by the system of FIGURE 2.

Referring now to FIGURE 2 the pressure transducer 32 (FIGURE 1) consists of a pressure responsive element 46 which is connected to upset the balance point of a Wheatstone bridge 48 with changes in the pressure sensed. The Wheatstone bridge circuit 48 is supplied with power from a rectifier bridge 50 which is, in turn, connected to one of the secondary windings 52 of a power transformer 54. An additional rectifier bridge 56 is supplied with power from a secondary winding 58 of transformer 54 and is connected to rectify the power supplied to a resistance network 60 which acts as a reference signal producing source. Inasmuch as both of rectifier bridges 50 and 56 are connected to secondary windings of the same transformer it will be recognized that power fluctuations in the alternating current power source will effect both the control signal appearing in bridge 48 and the reference signal appearing in bridge 60 in the same manner. An additional alternating current power transformer 62 is shown having a secondary winding 64 connected to a first stage and a secondary winding 66 connected to a second stage of a push-pull, full-wave magnetic amplifier 68. The magnetic amplifier 68 is basically identical to that shown in the Patent No. 2,841,336 issued in the name of Lyle Martin (common assignee) with certain minor exceptions hereafter noted. The alternating current power sections of each stage of the magnetic amplifier are balanced in such manner that there should be no output from the stage in the absence of a signal on the direct current input windings. The input to the first stage of the magnetic amplifier appears as a signal across windings 70 and 72 which are connected in such manner as to aid the flux in one of the associated cores and to oppose the flux in the opposite associated core thereby upsetting the balance of the amplifier and producing an output voltage measurable between conductors 74 and 76 and which is applied through a resistor 78 to signal windings 80 and 82 in the second stage of the magnetic amplifier 68. The output of the second stage of the amplifier then appears as a voltage measurable between conductors 84 and 86, and this voltage output is supplied to the torque motor 36 (FIGURES 1 and 3). This same output voltage is also connected through a pair of conductors 88 and 90 to a degenerative lag feedback circuit consisting of a pair of resistors 92 and 94 and a capacitor 96 which act to provide a feedback signal to the first stage of the magnetic amplifier by supplying a signal to the feedback windings 98 and 100 which are wound on the same cores as direct current signal windings 70 and 72, respectively. A feedback signal from the rate generator 44 (FIGURES 1 and 3) is supplied to direct current windings 102 and 104 of the first stage of the magnetic amplifier 68 which windings are also associated with the same cores as signal windings 70 and 72, respectively. The level of the feedback signal appearing on windings 102 and 104 is adjustable by means of a potentiometer 106.

With respect to the reference signal circuit 60, it has been pointed out that the rectifier bridge 56 supplying this circuit is supplied from the same source as is the rectifier bridge 50 which supplies the Wheatstone bridge circuit 48. Because of the non-linear characteristics of the rectifiers it is desirable that both rectifier bridges be connected so as to work into approximately the same impedance. A resistor 108 has been connected in circuit 60 to cause circuit 60 to have approximately the same impedance level as the resistance bridge 48. A resistance 110 connected between the bridge 56 and the potentiometers 112 and 114 is of very high resistance value compared with resistance values of said potentiometers with the result that the reference circuit has a substantially constant current output irrespective of the setting on either potentiometer 112 or potentiometer 114. The power lever 33 is connected to a potentiometer 116 which is connected across the potentiometer 114, and which provides the primary reference signal subject to a maximum reference adjustment on potentiometer 112 and a minimum reference adjustment on potentiometer 114.

FIGURE 3 shows the electro-hydraulic control unit 38 partially in section including the torque motor, the hydraulic amplifier circuit, and the metering valve and rate generator section. Hydrogen peroxide or other oxidizer is supplied to the inlet conduit 40 where it enters a chamber 122, flows across a metering orifice 124 into an outlet chamber 126, and out of outlet conduit 42. A metering valve member 130 which acts to vary the effective area of orifice 124 is moved axially by means of a piston 132 positioned in a cylinder 134 and a piston 136 positioned in a cylinder 138. A portion of the flow entering chamber 122 flows into the conduit 140 and through restrictions 142 and 144 to conduits 146 and 148 which communicate with a pair of orifices 150 and 152 respectively. Flow through these orifices enters a chamber 154 having an outlet passage 156 in communication with the metered fluid chamber 126. The flow from orifices 150 and 152 is controlled by means of the torque motor 36 which is shown in centered position. When in the position shown the flow from each orifice is approximately the same and there is no significant pressure differential in conduits 146 and 148 and hence in cylinders 134 and 138. Should the signal from the magnetic amplifier 68 (FIGURE 2) supplied to the torque motor 36 cause the armature to be moved toward orifice 150, a pressure build up will occur in line 146 and chamber 134 thus causing piston 132 to be moved to the left and opening metering valve 130. As the armature moves toward orifice 152 the pressure build up will occur in line 148 and chamber 138 thus moving piston 136 to the right and closing metering valve 130. A conduit 158 is drilled through the interior of the metering valve member 130 in order to equalize the pressure on the right side of piston 136 at the same value as the fluid in the metered fluid chamber 126 on the left side of piston 132.

Because of the highly corrosive properties of hydrogen peroxide and similar oxidizers it is necessary that all parts of this unit which are exposed to contact with such materials be manufactured of material which is highly resistant to the corrosive action of such liquids. A high resistance to the oxidizing qualities of hydrogen peroxide, for instance, is especially necessary because of the fact that the properties of the oxidizing process normally tend to be somewhat catalytic with respect to the hydrogen peroxide thus resulting in an undesirable generation of heat and gas in the metering unit 38 ahead of the gas generator 30. By making the entire unit out of such materials as 300 series stainless steel and by using the configuration shown herein, it is possible to provide a servo-powered metering valve wherein the oxidizer is used as the servo fluid and no dynamic seals with their attendant problems of power loss and hysteresis are necessary. The fit of pistons 132 and 136 in their respective cylinders and of valve member 130 in its guide is simply a close machine fit and a certain amount of leakage across these members is taken into consideration in calibrating the unit.

The rate generator 44 is composed of the piston 136 which has embedded therein a permanent magnet member 160 which is inductively related with a pair of coils of wire 162 and 164 wound around the outside of cylinder 138 in the housing of member 38. Movement of the valve member 130 and a resulting movement of piston 136 and the permanent magnet 160 will result in a voltage being generated in windings 162 and 164 varying in polarity with the direction of movement and in magnitude with the speed of movement of the magnet 160. A linear rate generator of the type shown herein is described in considerable detail in U.S. Patent No. 2,842,688 issued to Lyle Martin (common assignee). Used in the environment of the present application it was necessary that the permanent magnet 160 be protected from contact with the hydrogen peroxide in the system and this is accomplished by enclosing it in the interior of the piston 136, said piston being fusion welded together after the magnet is placed therein.

In discussing the operation of the system shown herein, it will first be assumed that no change is taking place and that the system is stabilized at a value of thrust output which is equal to that requested on the power lever 33. Under these conditions the output of the pressure transducer 32 and hence the Wheatstone bridge 48 will equal that of the reference circuit 60 and there will be no signal in the signal winding 70 and 72 of the magnetic amplifier 68. There is therefore no output from amplifier 68 and the torque motor 36 is held in its centered position as shown. The fluid pressure applied against the right side of piston 132 and the left side of piston 136 is exactly the same and the metering valve 130 is held in a stationary position. A change in the value of the thrust output in chamber 10 or a change in the position of power lever 33 will result in an unbalance between the outputs of resistance bridge 48 and the reference circuit 60 and this unbalance signal will appear as the direct current error signal appearing on windings 70 and 72 of the magnetic amplifier. This signal causes an unbalance in the saturation of the associated cores and an unbalance in the output of the power section of the first stage magnetic amplifier thus resulting in a signal being supplied to the second stage windings 80 and 82. The signal is thus further amplified in the second stage and is supplied through conductors 84 and 86 to the torque motor 36. A portion of this signal is also supplied to the degenerative lag feedback windings 98 and 100 for stabilization purposes. Let us assume that the signal supplied to the torque motor is of such polarity as to cause the armature to be moved toward the orifice 150. This results in an increase in the pressure of the hydrogen peroxide acting in chamber 134 against piston 132 and causes piston 132 to move toward the left thus increasing the effective area of metering orifice 124 and causing a larger flow of hydrogen peroxide to the gas generator 30. Movement of the metering valve member 130 also causes movement of the piston 136 and the magnet 160 thereby causing a voltage to be generated in windings 162 and 164 which voltage is applied to feedback signal windings 102 and 104 of the first stage of the magnetic amplifier 68. The increasing flow from outlet 42 to the gas generator 30 results in generation of a larger amount of high temperature steam and oxygen to drive the turbine 26 which means that more energy is available to drive the pumps 14 and 20 and these pumps will then supply a greater amount of fuel and oxidizer to the thrust chamber 10. When the error signal is of such polarity as to cause the torque motor to move in the opposite direction against orifice 152, the opposite result would have been obtained, the flow through conduit 42 being decreased and the output from the gas generator 30 being decreased.

While only one embodiment is shown and described herein, modifications may be made to suit the requirements of particular applications.

We claim:

1. In a thrust control system for a rocket engine having a thrust chamber to which a fuel and an oxidizer are supplied, a pump for each of said fuel and said oxidizer, a turbine for driving said pumps, a source of said oxidizer, and a gas generator for generating a gas at high temperature and pressure from said oxidizer to drive said turbine, the combination of means producing an electrical signal varying with the pressure sensed in the thrust chamber, means producing a thrust reference signal, means comparing said signal with said reference signal to produce an error signal having a polarity and magnitude depending on the direction and extent of departure of said signal from said reference, magnetic amplifier means for amplifying said error signal, a metering unit for controlling flow of the oxidizer to the gas generator to thereby control the speed of the turbine including a conduit connected to supply the oxidizer to the gas generator, a metering valve in said conduit movable to vary the effective area thereof, cylinder means and piston means slidable therein operatively connected to said valve, said piston means being provided with first and second opposed surfaces for actuating the same as a function of said error signal, a torque motor device responsive to said amplified error signal and connected to control operation of said piston and thus the position of said valve as a function of said amplified error signal, said torque motor device including means defining first and second orifices and a flapper valve movable between said orifices, first and second passage means connecting said first and second orifice means with said first and second opposed surfaces, respectively, a first passageway connected between said first passage means and said conduit upstream of said metering valve having a restriction therein, a second passageway connected between said second passage means and said conduit upstream of said metering valve having a restriction therein, a third passageway connecting the downstream side of said orifice means with said conduit on the downstream side of said metering valve, and a voltage generating device including a permanent magnet enclosed in the interior of said piston means and a coil of wire associated with said cylinder means containing said piston means, said voltage generating device being operatively connected to said magnetic amplifier means for producing a feedback signal thereto.

2. In a thrust control system for a rocket engine having a thrust chamber, a pump for supplying fuel to said chamber, a turbine for driving said pump, a source of highly corrosive propelling fluid, and a gas generator for producing gas at high pressure and temperature from said fluid to drive said turbine, the combination of means for producing an electrical signal varying with variations in a pressure sensed in the thrust chamber from a desired value, means for amplifying said signal, a metering device for controlling the flow of the fluid from the source to the generator including a conduit and a metering valve positioned in said conduit, a hydraulic amplifier including a pair of chambers, a piston movable in each of said chambers and operatively connected to said valve, a pair of passages connecting each of said chambers with said conduit upstream to said metering valve, torque motor means connected to said amplifying means operative to vary the pressure in said chambers with changes in said signal, and means for generating a feedback signal to said amplifying means which signal varies in magnitude with the rate of movement with said metering valve including a permanent magnet enclosed in the interior of one of said pistons and a winding concentrically wound around the cylinder containing said piston and said magnet.

3. In a thrust control system for a rocket engine having a thrust chamber connected to receive a highly corrosive fluid propellant from a source of the same, the combination of means producing an electrical signal varying with variations in the thrust chamber pressure from a desired value, means connected to control the highly corrosive fluid including a conduit, a metering valve in said conduit movable to vary the effective area thereof, a first cylinder and a piston slidable therein operatively connected to said valve, a second cylinder and a piston slidable therein operatively connected to said valve, a torque motor device responsive to the electrical signal produced by said first named means including means defining first and second orifices and a flapper valve movable between said orifices, first and second passage means connecting first and second orifice means with said first and second cylinders, a first passageway connected between said first passage means and said conduit upstream of said metering valve and having a restriction therein, a second passageway connected between said second passage means and said conduit upstream of said metering valve and having a restriction therein, a third passageway connecting the downstream side of said orifice means with said conduit downstream of said metering valve, and a voltage generating device including a permanent magnet enclosed in the interior of one of said pistons and a coil of wire associated with the cylinder containing said piston for producing a feedback signal which is connected to said electrical signal producing means.

4. In a thrust control system for a rocket engine having a thrust chamber connected to receive a highly corrosive fluid propellant from a source of the same, the combination of means producing an electrical signal varying with variations in the thrust chamber pressure from a desired value, means connected to control the highly corrosive fluid including a conduit, a metering valve in said conduit movable to vary the effective area thereof, a first cylinder and a piston slidable therein operatively connected to said valve, a second cylinder and a piston slidable therein operatively connected to said valve, a torque motor device responsive to the electrical signal produced by said first named means, including means defining first and second orifices and a flapper valve movable between said orifices, first and second passage means connecting said first and second orifice means with said first and second cylinders, a first passageway connected between said first passage means and said conduit upstream of said metering valve and having a restriction therein, a second passageway connected between said second passage means and said conduit upstream of said metering valve and having a restriction therein, and a third passageway connecting the downstream side of said orifice means with said conduit downstream of said metering valve.

5. In a thrust control system for a rocket engine having a thrust chamber, a pump for supplying fuel to said thrust chamber, a turbine for driving said pump, a source of highly corrosive propelling fluid, and a gas generator for generating a gas at high pressure and temperature from said fluid to drive said turbine, the combination of means producing an electrical signal varying with an operating condition which varies with the thrust output of the engine, means producing a thrust reference signal, means comparing said signal with said reference signal to produce an error signal having a polarity and magnitude depending upon the direction and extent of departure of said signal from said reference, magnetic amplifier means for amplifying said error signal, a metering unit for controlling flow of the highly corrosive propelling fluid to the gas generator to thereby control the speed of the turbine including a conduit connected to supply the highly corrosive propelling fluid to the gas generator, a metering valve in said conduit movable to vary the effective area thereof, a first cylinder and a piston slidable therein operatively connected to said valve, a second cylinder and a piston slidable therein operatively connected to said valve, a torque motor device responsive to said error signal including means defining first and second orifices and a flapper valve movable between said orifices, first and second passage means connecting said first and second orifice means with said first and second cylinders, a first passageway connected between said first passage means and said conduit upstream of said metering valve having a restriction therein, a third passageway connecting the downstream side of said orifice means with said conduit on the downstream side of said metering valve, and a voltage generating device including a permanent magnet enclosed in the interior of one of said pistons and a coil of wire associated with the cylinder containing said piston operatively connected to said magnetic amplifier means for producing a feedback signal thereto.

6. A thrust control system for a rocket engine as set forth in claim 5 wherein said magnetic amplifier means comprises a plurality of stages having an inverse-parallel, full-wave arrangement, the first stage including a first set of control windings upon which said electrical signal is impressed, a second set of control windings upon which the output of said rate generator is impressed, and a third set of control windings connected to supply a degenerative lag feedback signal from the output of said magnetic amplifier means.

References Cited in the file of this patent

UNITED STATES PATENTS

| | | |
|---|---|---|
| 2,697,417 | Mayer | Dec. 21, 1954 |
| 2,734,340 | Wood | Feb. 14, 1956 |
| 2,841,336 | Martin | July 1, 1958 |
| 2,842,688 | Martin | July 8, 1958 |
| 2,844,936 | Fowler et al. | July 29, 1958 |
| 2,866,476 | Orloff | Dec. 30, 1958 |
| 2,886,009 | Myers | May 12, 1959 |
| 2,949,007 | Aldrich et al. | Aug. 16, 1960 |

OTHER REFERENCES

Publication, Rocket Propulsion Elements, 2nd edition, by Sutton, John Wiley & Sons Inc., 1956, pages 298 and 299 relied on.

UNITED STATES PATENT OFFICE
CERTIFICATE OF CORRECTION

Patent No. 3,082,600          March 26, 1963

John R. Williamson et al.

It is hereby certified that error appears in the above numbered patent requiring correction and that the said Letters Patent should read as corrected below.

Column 5, lines 28 and 29, strike out "for actuating the same as a function of said error signal" and insert the same after "valve" in line 26, same column 5; column 6, line 75, strike out "responsive to said error signal".

Signed and sealed this 24th day of December 1963.

(SEAL)
Attest:

ERNEST W. SWIDER
Attesting Officer

EDWIN L. REYNOLDS
Acting Commissioner of Patents